US 6,611,364 B1

(12) United States Patent
Craig et al.

(10) Patent No.: US 6,611,364 B1
(45) Date of Patent: Aug. 26, 2003

(54) APPARATUS FOR FLAT-BED SCANNER IMAGING SYSTEM TRANSPORT

(75) Inventors: Samuel F. Craig, Pittsburg, CA (US); Eric Larkin, San Jose, CA (US)

(73) Assignee: Jerome E. Robertson, Los Altos, CA (US); trustee in Bankruptcy for Storm Technology, Inc.

( * ) Notice: Subject to any disclaimer, the term of this patent is extended or adjusted under 35 U.S.C. 154(b) by 0 days.

(21) Appl. No.: 09/357,713

(22) Filed: Jul. 20, 1999

Related U.S. Application Data
(60) Provisional application No. 60/093,831, filed on Jul. 22, 1998.

(51) Int. Cl.[7] ................................. H04N 1/04
(52) U.S. Cl. ..................................... 358/497
(58) Field of Search ................ 358/497, 494, 358/474, 471, 483; 250/208.1, 234, 235; 399/211; 355/66

(56) References Cited

U.S. PATENT DOCUMENTS

| | | |
|---|---|---|
| 4,050,812 A | 9/1977 | Koizumi et al. ............ 355/66 |
| 4,500,197 A | 2/1985 | Dannatt |
| 5,379,095 A | 1/1995 | Oishi |
| 5,548,417 A | 8/1996 | Sekimoto et al. ........... 385/474 |
| 5,734,483 A | 3/1998 | Itoh ........................... 358/496 |

Primary Examiner—Cheukfan Lee
(74) Attorney, Agent, or Firm—Townsend, Townsend & Crew LLP (57) ABSTRACT

The compact design of a CIS device is exploited, resulting in a more compact scanning mechanism and in lighter and smaller scanning devices. The CIS is incorporated into a drive belt attached to the length of the CIS. The CIS is forced to traverse the document by a drive mechanism that pulls the entire belt and CIS across the document while maintaining the tension necessary to keep the document in the narrow depth of focus. This mechanism provides a uniform force on the CIS, reducing the possibility of yawing motion, and keeps the document in focus through the tension on the drive belt. The combined CIS and transport mechanism power requirements can be supplied by standard computer interfaces, requiring no additional power supplies. This new mechanism also hides the internal workings of the scanner behind a drive belt that is the size of the platen window. The drive belt can either be printed to present the operator with instructions or markings to indicate document placement or with other information, or the drive belt can be left blank to present the operator with a cleaner and less cluttered scanning device.

11 Claims, 7 Drawing Sheets

APPARATUS FOR FLAT-BED SCANNER IMAGING SYSTEM TRANSPORT

CROSS-REFERENCES TO RELATED APPLICATIONS

This application claims priority from Provisional Application No. 60/093,831, filed Jul. 22, 1998, and entitled "APPARATUS FOR FLAT-BED SCANNER IMAGING SYSTEM TRANSPORT.

BACKGROUND OF THE INVENTION

1. Field of the Invention:

This invention relates to a scanning assembly for use in a flat-bed scanner, photocopier, facsimile machine, flat-bed output plotter or similar device. In particular, it relates to the imager (sensor and exposer) support and transport mechanisms of "flat-bed" type scanning devices.

2. Description of the Problem and Prior Art:

In a typical scanning device of the "flat-bed" configuration, a document to be scanned or exposed is placed face down on a platen window, while an imaging system on the opposite side of the platen window traverses the document, imaging the document through the window. While the problems described herein and the invention are applicable to input and output devices of the flat-bed type, including input scanners, photocopiers and output plotters, the discussion will be in terms of input scanners. It would be clear to one of ordinary skill in the art how to modify the invention to work for other flat-bed devices. The imaging system, typically an input scanner, is typically comprised of an illumination unit, focusing optics, and a linear imaging array. During scanning, a portion of the imaging system traverses the document in a direction perpendicular to the length of the linear imaging array. Existing imaging system configurations depend on many factors and typically use either charged coupled devices (CCD) or contact image sensors (CIS) imaging optics. In a typical prior art CCD-based scanner, some combination of the illumination unit and focusing optics traverses the document, while some combination of focusing optics and CCD array generally does not move. In a typical prior art CIS-based scanner, the illumination unit, fixed focusing optics and linear imaging array are contained in an integrated unit which traverses the document. This invention is applicable to the imaging system transport mechanism of CIS-based scanning devices although it also is applicable to other flat-bed imaging devices. Since the traverse mechanism used in CIS-based scanners have evolved from those designed for CCD-based scanners, it is appropriate to consider prior art CCD designs as also being prior art to the present invention.

In prior art systems, the traversing motion of the imaging system down the length of the scanner is usually accomplished by one of the following methods. The first prior art method includes a guide shaft of the length of the scanner and a drive mechanism. See for example U.S. Pat. No. 5,379,095 to Oishi entitled IMAGE READING APPARATUS WITH THE OPTICAL READING UNITS AND PHOTOELECTRIC CONVERSION DEVICE MOUNTED ON A COMMON GUIDE MEMBER (issued Jan. 3, 1995) and U.S. Pat. No. 5,610,731 to Itoh entitled IMAGE SCANNER HAVING CONTACT-TYPE IMAGE SENSOR MOVABLE UNDER AUTOMATIC DOCUMENT FEEDER (issued Mar. 11, 1997). In these prior art systems, the imaging system and shaft are at right angles, and are attached at one end of the imaging system by a bushing that restrains the image sensor motion. The imaging system is maintained in focus by a spring mechanism that locates the imaging system relative to the platen window. The second prior art arrangement includes a belt or pulley guide system in which the imaging system is pulled along the length of the scanner. See for example U.S. Pat. No. 4,500,197 to Dannat entitled TRANSPORT MEANS FOR FLAT BED SCANNER (issued Feb. 19, 1985) and U.S. Pat. No. 5,708,516. to Lin entitled MOVING MECHANISM OF A SCANNER (issued Jan. 13, 1998). The belts or pulleys are attached at one or both extreme lengthwise edges of the imaging system, and are, when two belts or pulleys are used, driven in unison to obtain the proper traversing motion. Many systems are further complicated by guy wire assemblies that are needed to keep the imaging system aligned and in focus during scanning.

In typical prior art scanning systems, the power requirements of the transport mechanisms is a large fraction of the total power requirements of the system. For example, when using a prior-art scanning device under computer control, the data bus connection may power the imaging electronics and possibly even the illumination optics, and an external power source may be used to power the transport mechanism. The additional power supply needed to power prior art transport mechanisms adds complexity and cost to these systems. Recently, new computer interface standards, such as the universal serial bus (USB) standard, have become available, with the capability of supplying power to a peripheral device, such as a scanner, from the computer data bus rather than from a separate power supply. It would be advantageous to have a transport that can be powered from the computer, for example, via a USB interface. The amount of power available via such a USB is limited to about 2.5 watts. Since in a typical scanner approximately 1.75 watts is used by a CIS imaging unit, only 0.75 watts available for other uses. Prior art transport mechanisms typically require much more than 0.75 watts. The additional power supply needed to power prior art transport mechanisms adds complexity and cost to these systems.

Figure 14:
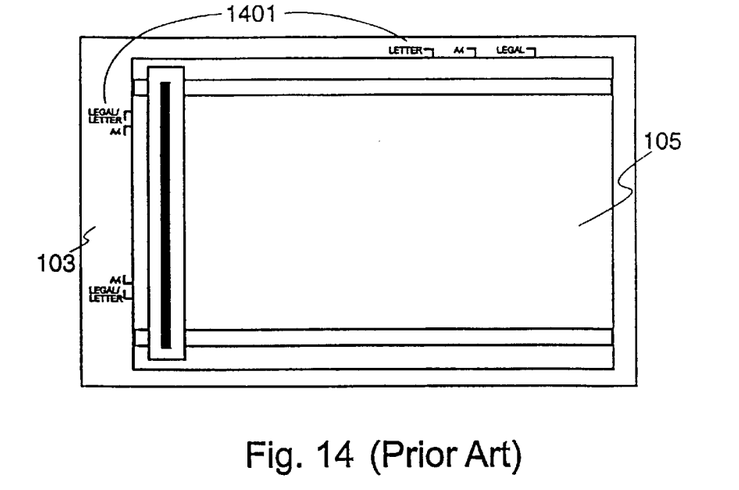
FIG. 14 is an illustration of the operator view of a prior art flat-bed scanner.

Another limitation of prior art scanners is illustrated in FIG. 14 which shows registration marks on the outer perimeter of a prior art scanner window. The correct placement of the document on the scanner is accomplished through registration marks 1401 on the scanner housing at the edge of the platen window. As scanners are capable of accepting many different document sizes, including U.S. and European standards, and orientations, the markings on the edge of the platen window can be numerous and confusing to the operator.

The prior art imaging system transport mechanisms discussed above suffer from the following limitations: 1) the transport mechanism includes many parts to enable the imaging optics to scan smoothly across the document without any unwanted motion; 2) the transport mechanisms are bulky and not very efficient, requiring larger amounts of power to drive them than would be required with efficient, lightweight transport mechanisms; 3) for computer-controlled devices, the transport mechanisms require power in excess of that available from new computer interfaces such as a USB; and 4) useful information, including but not limited to document registration markings, are not visible through the platen window where they would be most useful. Thus there is a need in the art for an imaging system transport mechanism that is both more compact and efficient, allowing for reduced consumption of electrical power by the transport mechanism, and allowing for useful information to be visible to the scanner operator through the scanner platen window.

SUMMARY OF THE INVENTION

In one aspect of this invention, the compact design of a CIS device is exploited, resulting in a more compact scanning mechanism and in lighter and smaller scanning devices. The CIS is incorporated into a drive belt attached to the length of the CIS. The CIS is forced to traverse the document by a drive mechanism that pulls the entire belt and CIS across the document while maintaining the tension necessary to keep the document in the narrow depth of focus. This mechanism provides a uniform force on the CIS, reducing the possibility of yawing motion, and keeps the document in focus through the tension on the drive belt. The combined CIS and transport mechanism power requirements can be supplied by standard computer interfaces, requiring no additional power supplies. This new mechanism also hides the internal workings of the scanner behind a drive belt that is the size of the platen window. The drive belt can either be printed to present the operator with instructions or markings to indicate document placement or with other information, or the drive belt can be left blank to present the operator with a cleaner and less cluttered scanning device.

Objects of the invention

Accordingly, an object of the invention is to reduce the size of flat-bed scanner image sensor transport mechanisms.

It is another object of this invention to produce a more compact flat-bed scanning device.

It is yet another object of this invention to produce a computer connected scanning device that could be powered entirely from standard computer-scanner interface connections.

It is another object of this invention to produce a flat-bed scanner that presents the scanner operator with information necessary to operate the scanner, the information visible through the platen window.

DESCRIPTION OF THE SPECIFIC EMBODIMENTS

Figure 1:
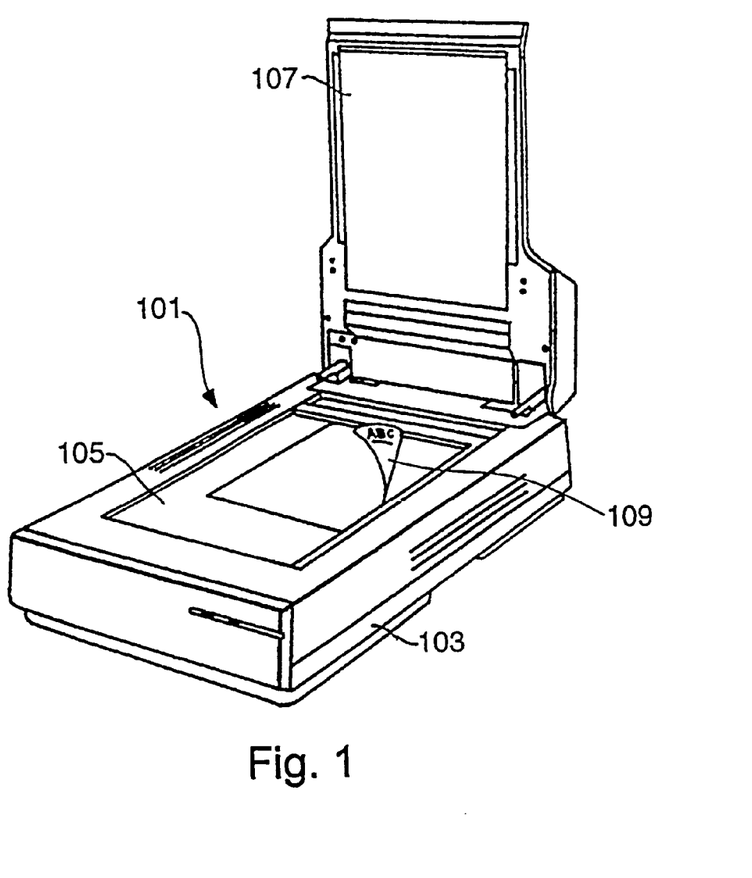
FIG. 1 is a perspective view of the external appearance of a flat-bed scanner.

The external appearance of a flat-bed scanner 101 is shown in FIG. 1. While FIG. 1 shows a conventional flat-bed scanner configuration which may be labeled prior art, a flat-bed scanner incorporating the mechanism of this invention is not prior art. Scanner 101 consists of a scanner housing 103, a platen window 105, and a document cover 107. A document 109 is scanned by placing the document face down on platen window 105 and closing document cover 107 over the document. The force of the document cover forces the document onto the platen window, keeping the document in focus during scanning.

Figure 2:
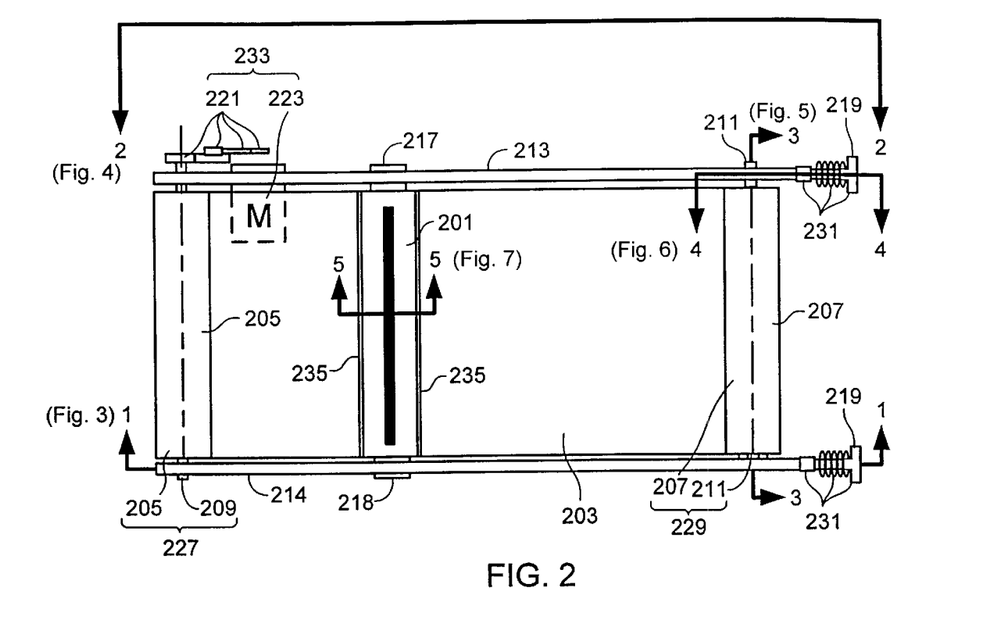
FIG. 2 is a top view of the first embodiment of the transport mechanism.
Figure 3:
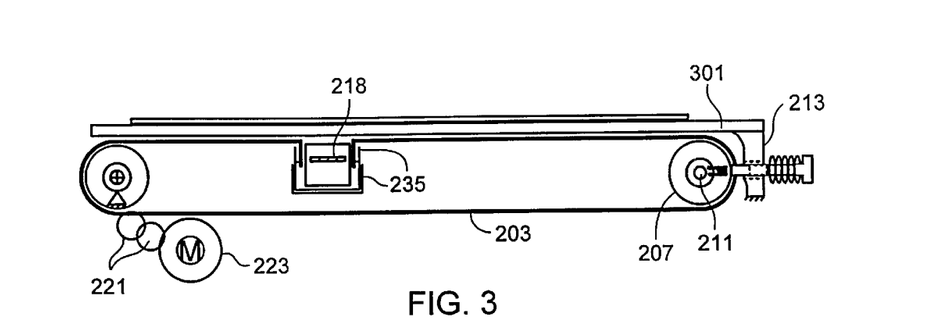
FIG. 3 is cross-sectional view 1—1 from FIG. 2, showing details of the CIS unit, belt drive and drive rollers.
Figure 4:
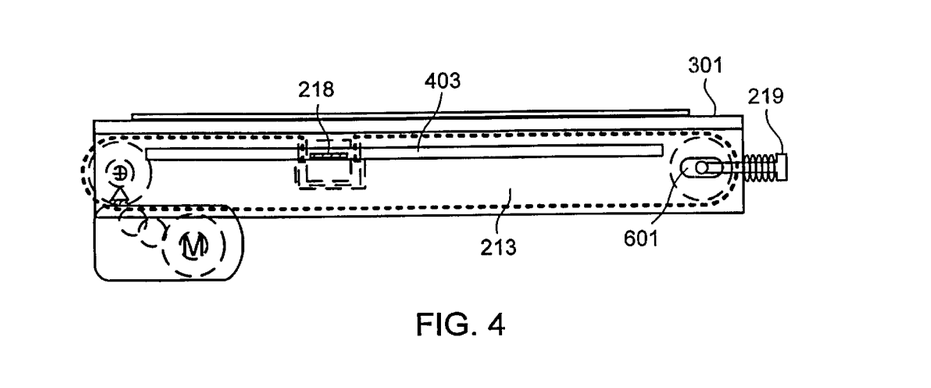
FIG. 4 is side view 2—2 from FIG. 2.
Figure 5:
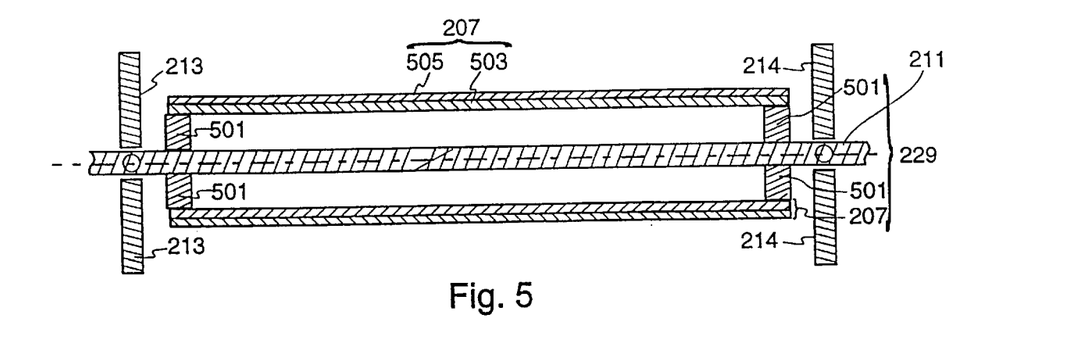
FIG. 5 is cross-sectional view 3—3 from FIG. 2, showing roller assembly detail.
Figure 6:
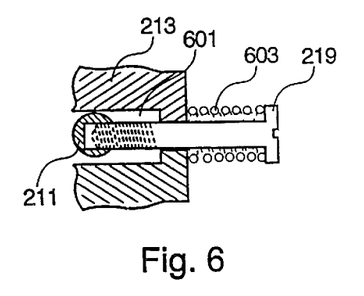
FIG. 6 is cross-sectional view 4—4 from FIG. 2, showing roller tensioning mechanism detail.
Figure 7:
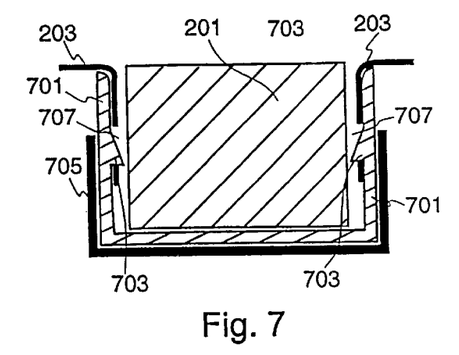
FIG. 7 is an expanded view of FIG. 3, showing CIS/drive belt attachment detail (cross sectional view 5—5 of FIG. 2).

A description will now be given of a first embodiment of a flat-bed imaging transport mechanism according to the present invention. FIG. 2 is a top view of this first embodiment. FIG. 3 is the cross-sectional view shown in FIG. 2 as 1—1, with details of the CIS unit, belt drive and drive rollers. FIG. 4 is a side view labeled 2—2 in FIG. 2. FIG. 5 is a cross-sectional view labeled 3—3 from FIG. 2, showing details of the roller assembly. FIG. 6 is the cross-sectional view 4—4 of FIG. 2, showing detail of the roller tensioning mechanism. FIG. 7 is the cross sectional view labeled 5—5 in FIG. 2 showing details of the CIS/drive belt attachment. It would be clear to one of ordinary skill in the art that the transport mechanism described herein for the embodiments described is only one of many variations of components that would allow for the objectives of the present invention to be achieved.

Starting first with the top view of FIG. 2 and the side views of FIGS. 3 and 4, the transport mechanism is comprised of the following components: a drive belt 203 attached lengthwise to a contact image sensor (CIS) 201 by a drive belt-to CIS attachment mechanism 235, a pair of roller assemblies, specifically a drive roller assembly 227 and a passive roller assembly 229, a belt tensioning mechanism 231, a CIS-document positioning mechanism which includes sliders 217 and 218 in combination with slider guides 213 and 214, and a drive mechanism 233. In FIG. 2, CIS 201 is located about one third of the way between the drive roller assembly 227 and passive roller assembly 229. Drive belt 203 extends along the lengthwise edge of the CIS 201 with sufficient coverage of that edge allow the drive belt 203 to pull the CIS 201 in the scanning direction and to make the belt-driven mechanism efficient for scanning purposes. Drive belt 203 is made of a lightweight, flexible material that will not stretch appreciably in the direction of motion of CIS 201 during scanning, and that can be configured to maintain tension over many use cycles and for long periods of time.

Acceptable drive belt 203 materials include any material that is suitable for a thin-film belt, including for example, paper, polyester, mylar, and a spun-bonded olefin such as TYVEK® from E.I. du Pont de Nemours and Company, Wilmington, Del. If adding printed matter visible through the glass platen is desirable, the material should also be printable. The preferred embodiment uses TYVEK®, in particular TYVEK 1079D which is approximately 0.0085 inches (0.21 mm) thick.

The loop of drive belt 203 passes from the CIS 201, around a drive roller 205, around a passive roller 207, and back to the CIS 201. The drive belt 203 must be long enough to complete the drive belt loop with enough material for attachment of the drive belt 203 to the CIS 201. The width of drive belt 203 should preferably be slightly wider than the glass platen. In the preferred embodiment in which the CIS is 238 mm for scanning a document which is up to about 8.5 inches, the drive belt is 220 mm.

The side cross-sectional view marked 1—1 in FIG. 2 is shown in FIG. 3. This shows how drive belt 203 is attached to the edges of CIS 201 by drive belt-CIS attachment mechanism 235. Attachment mechanism 235 surrounds the CIS 201 and secures the ends of drive belt 203 to the CIS. This is shown in more detail in FIG. 7, where it is shown that the drive belt-CIS attachment mechanism 235 is comprised of a CIS carrier 701 with interior drive belt restraining pins 703, and a drive belt restraining clip 705. The CIS carrier 701 is adapted to receive the CIS 201. The drive belt restraining pins 703, which are interior to the CIS carrier 701, are configured to fit inside a matching set of drive belt perforations 707. Drive belt perforations 707 can be of any shape, are numerous enough to restrain the drive belt 203 during scanning, and are reinforced with a glass reinforced polycarbonate plastic to prevent tearing of the drive belt 203. In the preferred embodiment, the perforations are circular. Restraining pins 703 are triangular as shown in FIG. 7. The function of the CIS carrier 701 in restraining drive belt 203 is aided by the force of the drive belt restraining spring clip 705 which surrounds the CIS carrier 701, forcing the drive belt restraining pins 703 against the CIS, and thus locking the drive belt 203 in place relative to the CIS 201. The structure of the CIS carrier 701 must be able to support the CIS 201 and provide a restraining force for the drive belt restraining pins 703. The preferred material for the CIS carrier structure 701 is glass filled polycarbonate with TEFLON and silicone added to reduce sliding friction. Any material with reasonable stiffness and a low coefficient of friction could alternatively be used. The drive belt restraining clip 705 forces the CIS carrier structure 701 against the CIS 201, and so must be stiff and spring like. In the preferred embodiment, restraining clip 705 is made of aluminum, and any similar resilient sheet material may be used.

Note that with this configuration of drive belt and rollers, by having the diameters of rollers 205 and 207 be slightly greater than the combined height of the CIS carrier 701 and drive belt restraining spring clip 705, drive belt 203 does not contact the drive belt restraining spring clip 705 on the back side of the loop of drive belt 203. This allows for a compact drive mechanism in which the imaging CIS unit 201 is entirely contained within belt 203.

Details of passive roller assembly 229 is shown in FIG. 5. The passive roller assembly 229 is comprised of the passive roller 207, a passive roller axle 211, and a set of bearings 501. The axle 211 is adapted to have a common axis with the roller 207, and to protrude from each side of the roller 207. The axle 211 and roller 207 are coupled and restrained to move with a common axis near the ends of each component by a set of bearings 501. The axle 211 may either be one continuous piece as shown in FIG. 5 or may consist of two short pieces that protrude from the roller 207 and extend to and are connected to the bearing 501. The axle is further restrained from rotating through couplings to a first slider assembly 213 and a second slider assembly 214 used for providing a slider slot for CIS sliders 217 and 218 as described herein below. The slider assemblies also provide for the axle to move to and from the drive roller 205. A drive belt tensioning mechanism maintains the distance between the centers of axles 209 and 211, and the tension on drive belt 203. The passive roller 207 is further comprised of a tubular roller 503 and a roller exterior coating or finish 505. The material for the tubular roller 503 is preferably aluminum, but other lightweight rigid materials are acceptable. The preferred material for the roller surface finish 505 is rubber, but any other material or surface finish that will have an acceptably large coefficient of friction with the relatively slippery TYVEK® drive belt 203 material and can be made to fit or bond to the tubular roller 503 without slipping is acceptable. Examples of alternative roller surface finish 505 would be knurling of the outer surface of the tubular roller 503. The drive roller assembly 227 is similar to the passive roller assembly 229 of FIG. 5. The main difference between the drive roller assembly and passive roller assembly, is that drive roller assembly 227 is comprised of a drive roller axle 209, and drive roller 205 is attached to a drive gear assembly 221 or similar mechanism for imparting force from a drive motor 223 to drive roller 205.

Figure 18:
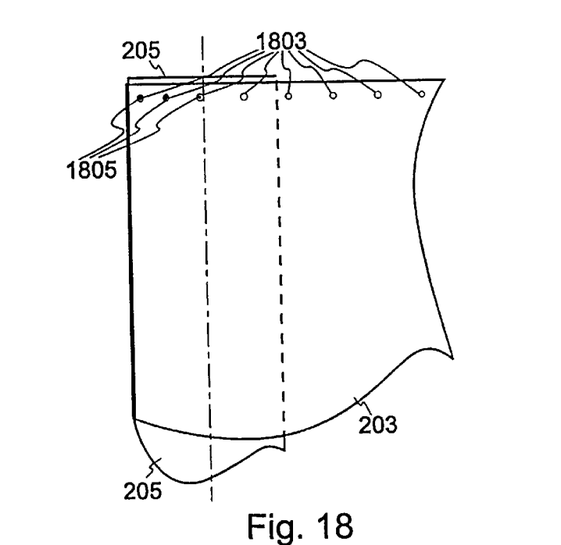
FIG. 18 shows part of the drive roller and part of the drive belt when sprocket holes are included in the drive belt, and matching sprockets are included in the drive roller.

Note that in an alternate embodiment shown in FIG. 18, sprocket holes 1803 may be included in one or both sides of the drive belt 203, and sprocket pins 1805 adapted to fit into sprocket holes 1803 may be included on one or both edges of drive roller 205 to improve the grip on belt 203. Note that FIG. 18 only shows part of drive roller 205 and part of drive belt 203. When such sprocket holes 1803 are included, having a surface finish 505 with a high coefficient of friction may not be necessary.

The distance between the centers of axles 209 and 211 and the tension on drive belt 203 are maintained through two drive belt tensioning mechanisms 231, one of which is shown in detail in FIG. 6. In the first embodiment, a pair of drive belt tensioning mechanisms 231 are connected to the passive roller axle 211 on a first slider slot assembly 213 and a second slider slot assembly 214 as seen in FIG. 6. FIG. 2 shows that there are two such assemblies. The tensioning mechanism 231 is comprised of an opposing drive belt tension adjusting screw 219 and a compression spring 603 as shown in FIG. 6 (cross-sectional view 4—4 from FIG. 2). Axle 211 fits through an axle slot 601 in both the first slider slot assembly 213 and second slider slot assembly 214. Compression spring 603 imparts a force on axle 211 to create tension on drive belt 203. The amount of tension on the drive belt is fixed through the amount of tightening of screw 219. Axle 211 and screw 219 move together along slot 601.

The position of the CIS 201 relative to the platen window 301 is restrained by a CIS-document positioning mechanism. In this embodiment the CIS-document positioning mechanism is comprised of a pair of slider tabs or pins 217 and 218, a pair of slider slots 403 located in a first slider slot assembly 213, a second slider slot assembly 214, and the platen window 301. The pair of slider tabs or pins 217 and 218 are attached at opposite, lengthwise ends of the CIS carrier 701. The sliders are shown in top view in FIG. 2 and side view in FIG. 4. In FIG. 3, only part of slider assembly 213 is shown. Sliders 217 and 218 are constructed of an acetal resin (e.g., DELRIN® from E.I. du Pont de Nemours and Company, Wilmington, Del.) or some other rigid, low coefficient of friction material. The sliders fit in slider slots 403. These slots are adapted to receive sliders 217 and 218, such that the sliders slide in the slots. Slider slot assemblies 213 and 214 are both mounted to a platen window 301 by either epoxy or double sided tape. Motion of the CIS 201 through movement of the drive belt 203 is accomplished through drive mechanism that is comprised of drive roller gear assembly 221 attached to the drive roller 205, and is engaged by a drive motor 223. The drive mechanism could alternatively be replaced with a drive belt or chain assembly to impart rotational motion to drive roller 205. The motor 223 is located at the end of the first glide assembly 213 located near the drive roller 205. The entire transport mechanism including the motor and gear assembly is held rigid and in place by the use of the platen window 301 to support the slider slot assemblies 213 and 214. Through the various connections the CIS 201 is held in focus and its motion is constrained to be perpendicular to the lengthwise axis of the CIS 201. Note that the slider slot assemblies also incorporate slot 601 for axle 211 for the tensioning mechanism.

The operation of the first embodiment will now be described. At the beginning of a scanning cycle, the CIS 201 is located near to either the drive roller 205 or the passive roller 207. Drive belt 203 is maintained with tension and aligned by the drive belt tensioning mechanism 231 using both the first slider slot assembly 213 and the second slider slot assembly 214. Scanning motion produced by action of the drive mechanism 233, which in the first embodiment comprises a motor 223, which is geared through the drive roller gear assembly 221 to drive roller 205. Due to the tension induced in the drive belt 203 using the tensioning mechanism 231, and through the interaction of the roller surface finish 505, the rotation of the drive roller 205 imparts motion to drive belt 203. While the drive belt 203 imparts motion during scanning, the position of the CIS 201 relative to the scanned document is maintained through the interaction of the sliders 217 and 218 in the slider slots 403 located in the first and second slider slot assemblies 213 and 214. The slider slots 403 are adapted to have sliding clearance with the sliders 217 and 218. Since the CIS 201 is fixed relative to the sliders 217 and 218 through attachment to the CIS carrier 701, and since the slider assemblies 213 and 214, which contain the slider slots 403, are fixed in the vertical direction relative to the platen window 301, the location of the CIS 201 is fixed vertically relative to the location of a document placed on the platen window 301. Hence the document will stay in focus during scanning. Note that even if the slots and slider slot assemblies were not included, the tensioning mechanism would still maintain the CIS 201 substantially at the same vertical level throughout the motion.

Figure 8:
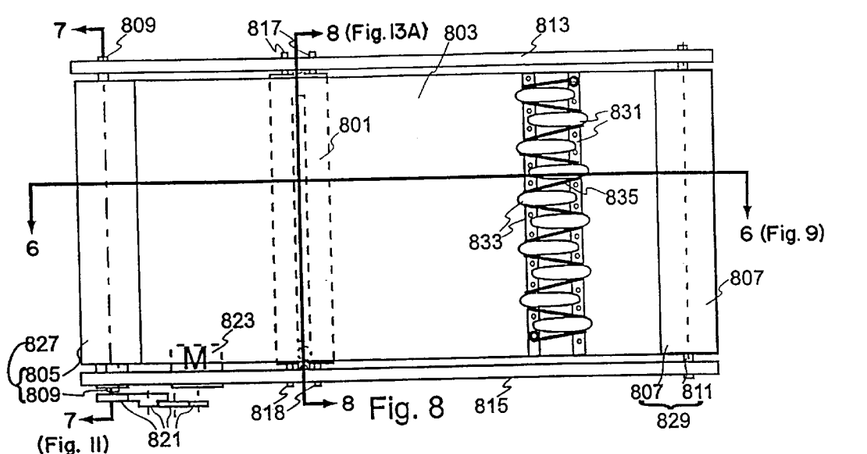
FIG. 8 is a bottom view of a second embodiment of the transport mechanism.
Figure 9:
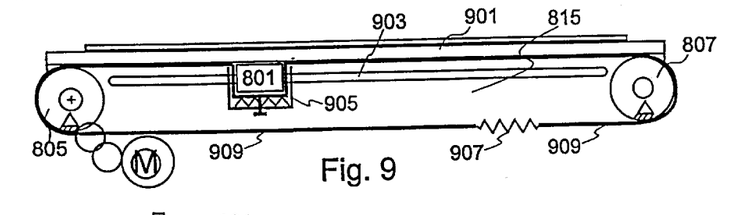
FIG. 9 is cross-sectional view 6—6 from FIG. 8, showing details of the CIS unit, belt drive and rollers.
Figure 11:
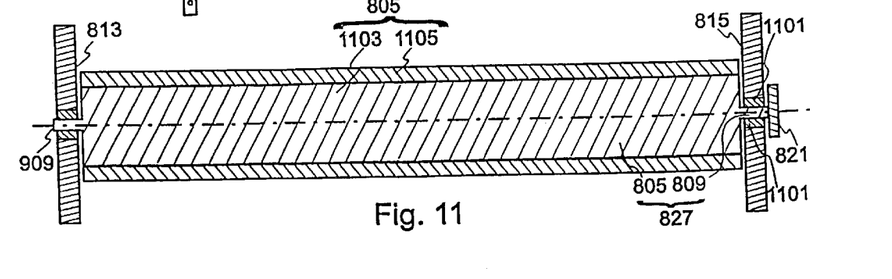
FIG. 11 is cross-sectional view 7—7 from FIG. 8, showing roller assembly detail.
Figure 12:
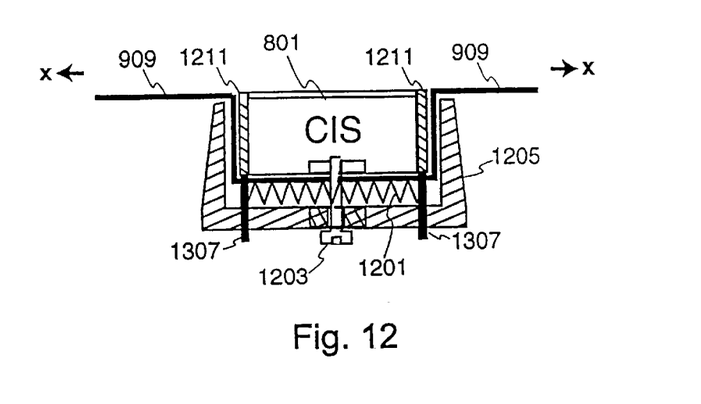
FIG. 12 is an expanded view of FIG. 9, showing the CIS/drive belt attachment.
Figure 13A:
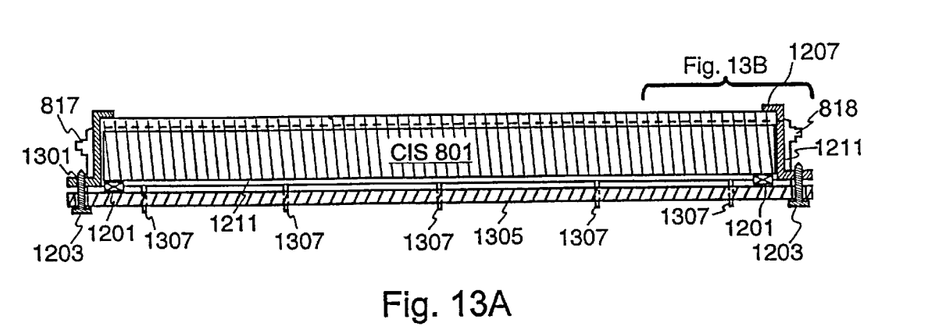
FIG. 13A show a cross-sectional view 8—8 from FIG. 8, showing additional CIS/drive belt attachment details.
Figure 13B:
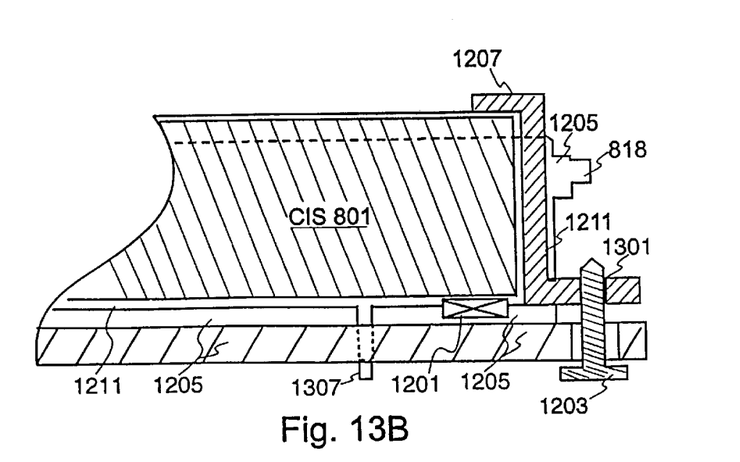
FIG. 13B is an enlarged view of a portion of the cross-sectional view illustrated in FIG. 13A.

A description will now be given of a second embodiment of a flat-bed imaging transport mechanism according to the present invention. FIG. 8 is a bottom view of the second embodiment of the transport mechanism according to the present invention. FIG. 9 is cross-sectional view 6—6 from FIG. 8, showing details of the CIS unit, belt drive and drive rollers. FIG. 11 is a cross-sectional view 7—7 from FIG. 8, showing details of the roller assembly. FIG. 12 is an expanded view of FIG. 9, showing details of the CIS/drive belt attachment. FIG. 13 is a cross-sectional view 8—8 from FIG. 8, showing details of a lengthwise cross-section along the CIS unit. The second embodiment incorporates modifications to components of the first embodiment that can be used as alternatives of the first embodiment as will be described subsequently. The equivalence and possible substitutions would be clear to one of ordinary skill in the art.

Figure 10:
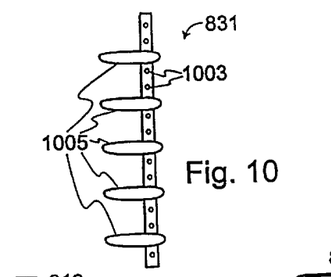
FIG. 10 illustrates one pin for connecting the end of an inelastic portion of the drive belt to the elastomeric portion of the drive belt

The essential components of the second embodiment of the present invention are shown in the FIG. 8 bottom view and FIG. 10 side view. FIG. 8 shows a bottom view of the second embodiment. The second transport mechanism embodiment is functionally equivalent to the first embodiment, and as such the reference numerals of the first embodiment components are used where appropriate. Specifically, the transport mechanism is comprised of the following components: a tensioning drive belt 803 attached lengthwise to a contact image sensor (CIS) 801 by a drive belt-CIS attachment mechanism 905, a pair of roller assemblies, specifically the drive roller assembly 827 and the passive roller assembly 829, the CIS-document positioning mechanism, and a drive mechanism 833.

The main functional difference between the second embodiment and the first is that in the second embodiment the tensioning drive belt 803 includes an elastomeric joint 907, and combines the functions of drive belt 203 and the tensioning mechanism 231 of the first embodiment. The tensioning drive belt 803 is an inelastic drive belt portion 909 and an elastomeric drive belt portion 907. In this embodiment the inelastic portion 909 is made of a lightweight, flexible material that will not stretch appreciably in the direction of CIS 801 motion during scanning, and can be configured to maintain tension during over many use cycles and for long periods of time. The preferred method of producing a tensioning drive belt 803 would be to incorporate loops, ridges or holes in the ends of the inelastic portion 909 and thread an elastic band or thread through the loops, ridges or holes to complete the belt 803.

Figure 10B:
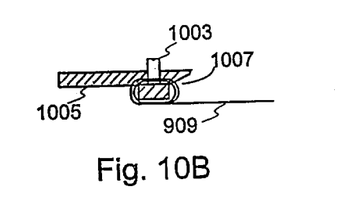
FIG. 10B shows the structure of how the end of the inelastic portion is attached to the pin and where the elastic band sits on the pin.
Figure 17:
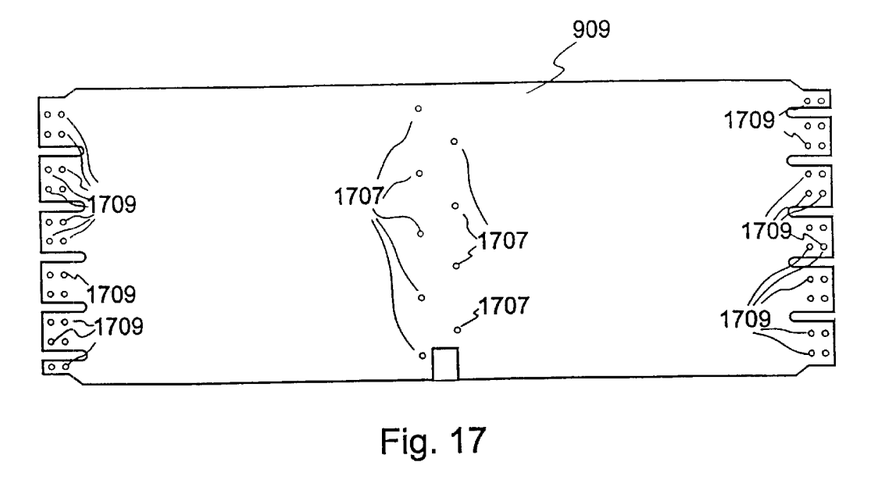
FIG. 17 shows the inelastic portion of the drive belt for the second embodiment of FIG. 8.

One method is shown in FIGS. 8 and 10. End pieces 831 and 833 are attached to each end of the inelastic portion 909 of tensioned belt 803. FIGS. 10A and 10B show one end piece 831. The end piece includes guides 1005 and pins 1003. FIG. 17 shows how each end of inelastic portion 909 includes holes 1709 designed to fit in pins 1003 and adapted to attach belt 909 to end pieces 831 and 833 by being wrapped around the end pieces as shown in FIG. 10B. The role of the end pieces is to provide for attaching an elastomeric material to the inelastic portion to make up elastomeric portion 907. The guides 1005 of end piece 831 are positioned to be between guides 1005 of end piece 833 as shown in FIG. 8. An elastic band 835 is wound from one of the pins (an end pin) of one end piece to an end pin of the other end piece back and forth between the endpieces through space 1007 (see FIG. 10B) to form an elastomeric drive belt section 907 attached to the inelastic drive belt portion 909. The preferred material for the elastic band 835 is EDPM rubber.

Many other alternatives can be used instead of the rubber band. For example, metal springs can be used.

Another alternate method is to have the elastomeric portion 907 be an elastic material. The preferred material is rubber. The preferred material for the inelastic portion 909 is TYVEK®. The preferred method of joining the elastic and inelastic portions is by sewing using techniques common in the garment industry for joining such materials together. Ultrasonic bonding or adhesives also may be used.

The combined elastic-inelastic portions of the tensioning drive belt 803 allow for automatic tensioning of the drive belt, and thus the tensioning drive belt 803 of the second embodiment encompasses the functionality of the first embodiment drive belt 203 and the first embodiment by the drive belt tensioning mechanism 231.

In the second embodiment, tensioning drive belt 803 is attached to CIS 801 by a drive belt-CIS attachment mechanism 905. The location of the attachment mechanism 905 relative to the transport mechanism is shown in FIG. 9, and details are shown in orthogonal cross-sectional views in FIGS. 12 and 13. Referring to FIGS. 12 and 13A, the drive belt-CIS attachment mechanism 905 is comprised of CIS carrier 1211 further comprising drive belt restraining pins 703 and a CIS positioning support 1201, a CIS carrier support 1205 with sliders 217, and a CIS positioning screw 1203. The CIS carrier 1211 is adapted to accept CIS 801. The CIS positioning support 1201 consists of a foamy, spongy or springy material that imparts a force onto the CIS 801 to position the CIS at the top of the CIS carrier 1211. The preferred material for the CIS positioning support 1201 is polyurethane foam, and any other high resistance, low compression set material may be used. Other force producing support structures such as one or more springs also would suffice. For example, compression springs could be used. Alternatively, the CIS 801 may be fixed to CIS carrier 1211 by some other means. The inelastic portion 909 of the drive belt 803 is threaded between the CIS carrier 1211 and the CIS carrier support 1205. The inelastic portion 909 of the drive belt is shown in more detail in FIG. 17. Drive belt perforations 1707 provide a matched set with drive belt restraining pins 1307 on CIS carrier 1211. Belt 909 when assembled will be under tension and will thus impart an upwards force on CIS carrier 1211 due to the tension producing the forces marked "X" in FIG. 12. The upwards motion of the CIS carrier 1211 is restrained through the CIS positioning screws 1203 that pass through the CIS carrier support 1205 and into threaded CIS positioning screw holes 1301. In tension, the drive belt rests on a CIS carrier upper ledge 1207, the tensioning drive belt 909 tension forcing the CIS carrier 1211 upwards, while the CIS carrier 1211 position is located through the use of CIS positioning screws 1203.

As shown in FIG. 9, the belt 909 is configured to loop from the drive belt CIS attachment mechanism 905 around the drive roller 805 and passive roller 807. The rollers 805 and 807 are rotationally attached at either end to the first slider slot assembly 813 and second slider slot assembly 815. Details of the roller assembly is shown in FIG. 11 for the drive roller assembly 827. This assembly differs significantly from that described in the first embodiment, however the construction techniques demonstrated in this embodiment could be incorporated into the transport mechanism of the first embodiment and similarly, the first embodiment transport mechanism may be used in this second embodiment. The drive roller 805 and drive roller axle 809 are formed of a single piece of material, or are assembled is such a way that there is no rotational velocity allowed between the roller and axle. As in the first embodiment, the roller is comprised of tubular roller 1103 with roller surface finish 1105. For the purposes of increasing friction between the drive belt 909 and rollers 805 and 807, surface finish 1105 should be a rubberized coating or knurled surface finish. The axle 809 is coupled to first and second slider slot assemblies (813 and 815) through bearings 1101. Thus the roller 805 and axle 809 rotate about their common axis at a position fixed by bearings 1101. The passive roller assembly 829 is constructed in the same manner, so that both the axis of the drive roller 805 and the passive roller 807 are fixed relative to one another.

To aid focus, the vertical position of the CIS 201 relative to the platen window 301 is restrained by the CIS-document positioning mechanism. In the second embodiment the CIS-document positioning mechanism, as shown in FIGS. 8 and 9, is comprised of slider tabs or pins 817 and 818, a pair of slider slots 903 located in the first slider slot assembly 813 and the second slider slot assembly 815, the CIS positioning screw 1203, and the platen window 901. Sliders 817 and 818, each of which is comprised of a pair of pins, are located on opposite, lengthwise ends of the CIS carrier support 1205. The sliders are shown in bottom view in FIG. 8. Sliders 817 and 818, and CIS carrier support 1205, are constructed of an acetal resin (e.g., DELRIN®) or some other rigid, low coefficient of friction material. The slider slot 903 in each of the first and second slider slot assemblies 813 and 815 is adapted to receive sliders 817 and 818. The CIS position screws 1203 provide for making small adjustments to the focus of the CIS 801 as it moves along slots 903 guided by sliders 817 and 818. The slider slot assemblies 813 and 815 are both mounted to a platen window 901 by either epoxy or double sided tape. Motion of the CIS 801 through movement of the drive belt 909 is accomplished through drive roller gear 821 attached to the drive roller 805, and is engaged by a drive motor 823. The motor 823 is located at the end of the second slider assembly 815 located near the drive roller 805. The entire transport mechanism is held rigid and in place by the use of the platen window 901 to support the slider assemblies 813 and 815. Through the various connections the CIS 801 is held in focus and its motion is constrained to be perpendicular to the lengthwise axis of the CIS 801. Again, as in other embodiments, the perpendicular focus may be maintained only by the tension on the drive belt.

The operation of the second embodiment will now be described. At the beginning of a scanning cycle, the CIS 801 is located near to either the drive roller 805 or the passive roller 807. Drive belt 909 is aligned through the fixed locations of the axis of the rollers 805 and 807, and is maintained in tension by the drive belt tensioning mechanism which is the result of the drive belt 909 having an elastomeric joint 907 (or a partially elastic portion). The tension and alignment of the rollers allows the drive roller 805 to produce scanning motion by action of the drive mechanism, which, as in the first embodiment, comprises a motor 823, which is geared through the drive roller gear 821 to drive roller 805. Due to the tension induced in the drive belt 909 through the interaction of the roller surface finish 1105, the rotation of the drive roller 805 imparts motion to drive belt 909. While the drive belt 909 imparts motion to the CIS 801 during scanning, the position of the CIS 801 relative to the scanned document is maintained through the interaction of the sliders 817 and 818 in the slider slots 903 located in the first and second slider slot assemblies 813 and 815. The slider slots 903 are adapted to have sliding clearance with the sliders 817 and 818. Since the CIS 801 is fixed relative to the sliders 817 and 818 through attachment to the CIS carrier 1211, and since the slider assemblies 813 and 815, which contain slider slots 903, are fixed relative to the platen window 901, the location of the CIS 801 is fixed in the vertical direction relative to the location of a document placed on the platen window 901. Hence the document will stay in focus during scanning.

Figure 15:
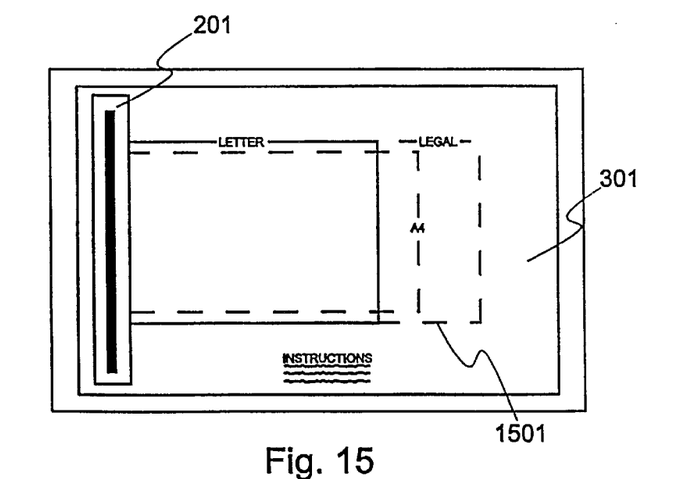
FIG. 15 is an illustration of the operator view of the present invention.

Another feature of previous and subsequently discussed embodiments is the use of drive belts 203 or 803 to provide useful markings for scanner operation. A top view of the preferred embodiment as seen by a flat-bed scanner users is shown in FIG. 15. In looking downwards through platen window 301, drive belt 203 for the case of the first embodiment or drive belt 801 for the case of the second embodiment is visible. Illustrative markings 1501 printed on the belt provide useful information, such as grid lines and instructions, to those using the flat-bed scanner. Marketing information, logos, etc. may also be included. This information is clearly useful and easier to obtain than in prior art scanner configurations.

Figure 16:
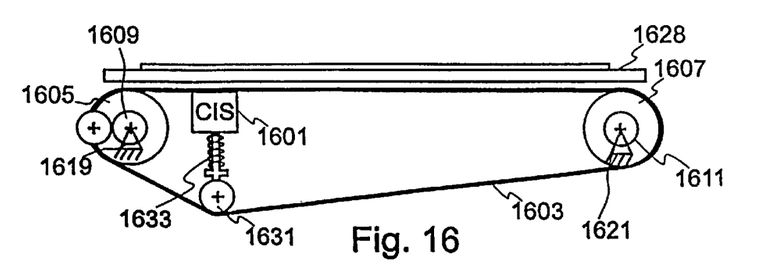
FIG. 16 is a side view of yet another of a transport mechanism according to an aspect of this invention.

FIG. 16 shows yet another embodiment. Like the second embodiment, drive roller 1605 and passive roller 1607 have axles 1609 and 1611 respectively, and these are fixed with respect to platen window 1628 as shown schematically by anchors 1619 and 1621 on the axles in FIG. 16. Tension on the drive belt 1603 is maintained by a tensioning mechanism which comprises a third roller 1631 together with a resilient forcing mechanism 1633 which imparts a vertical force downwards on roller 1633 and hence on drive belt 1603. The resilience allows for creep and other variations. An adjustment mechanism also is included. In one version, the resilient forcing mechanism includes a screw for adjustment and a spring to provide resilience.

In another aspect, the same tensioning mechanism 1633 also is adapted to impart an upwards vertical force on CIS 1601 in order to maintain close contact with the platen 1628 and thus keep the document in focus for the CIS during scanning.

Hence, although this invention has been described with respect to preferred embodiments, those embodiments are illustrative only. Many other embodiments of the present invention are possible within the scope of this invention. No limitation with respect to the preferred embodiments is intended or should be inferred. It will be observed that numerous variations and modifications may be effected without departing from the true spirit and scope of the novel concept of the invention, and it is intended that the scope of the invention be defined by the patent claims.

What is claimed is:

1. An imaging apparatus comprising:
   a platen window;
   an image sensor positioned on a first side of said platen window;
   a drive belt connected to said image sensor, said drive belt extending at least substantially across said platen window and substantially along a length of said image sensor;
   a tensioning member for applying tension to said drive belt; and
   a roller engaging said drive belt,
      wherein said tensioning member includes a biasing member applying a biasing force to said roller.

2. The apparatus of claim 1 further comprising:
   a track positioned on said first side of said planten window to engage said image sensor to maintain a distance from said image sensor to said platen window.

3. The apparatus of claim 1 wherein said image sensor comprises a contact image sensor (CIS).

4. The apparatus of claim 1 further comprising:
   an image sensor carrier supporting said image sensor; and
   a positioning support to impart a force to said image sensor to position said image sensor at the top of said image sensor carrier.

5. The apparatus of claim 1 further comprising:
   markings on said drive belt that are visible through said platent window for aiding in alignment of an image on said platen window.

6. The apparatus of claim 1 wherein said drive belt covers the entire area of said platen window.

7. An imaging apparatus comprising:
   a platen window;
   an image sensor positioned on a first side of said platen window;
   a drive belt connected to said image sensor, said drive belt extending at least substantially across said platen window and substantially along a length of said image sensor;
   a tensioning member for applying tension to said drive belt, wherein said tensioning member comprises an elastomeric portion of said drive belt.

8. An imaging apparatus comprising:
   a platen window;
   an image sensor positioned on a first side of said platen window;
   a drive belt connected to said image sensor, said drive belt extending at least substantially across said platen window and substantially along a length of said image sensor;
   a tensioning member for applying tension to said drive belt; and
   first and second rollers engaging said drive belt so that said drive belt forms a loop around said rollers,
      wherein said tensioning member includes a biasing member extending between said image sensor and an opposite portion of said drive belt on said loop.

9. An imaging apparatus comprising:
   a platen window;
   an image sensor positioned on a first side of said platen window; and
   a drive belt connected to said image sensor, said drive belt extending at least substantially across said platen window and substantially along a length of said image sensor,
      wherein said drive belt is less than 0.02 inches thick.

10. An imaging apparatus comprising:
    a platen window;
    an image sensor positioned on a first side of said platen window; and
    a drive belt connected to said image sensor, said drive belt extending at least substantially across said platen window and substantially along a length of said image sensor,
       wherein said drive belt is made of a spun-bonded olefin.

11. An imaging apparatus comprising:
    a platen window;
    a contact image sensor (CIS) positioned on a first side of said platen window;
    a drive belt connected to said image sensor, said drive belt extending at least substantially across said platen window and substantially along a length of said image sensor;
    a track positioned on said first side of said platen window to engage said image sensor to maintain a distance from said image sensor to said platen window; and
    a tensioning member for applying tension to said drive belt; and
    a roller engaging said drive belt,
       wherein said tensioning member includes a biasing member applying a biasing force to said roller.

* * * * *